Aug. 10, 1954  G. W. SCHROEDER  2,686,250
ELECTRIC HEATING APPARATUS
Filed Nov. 2, 1951
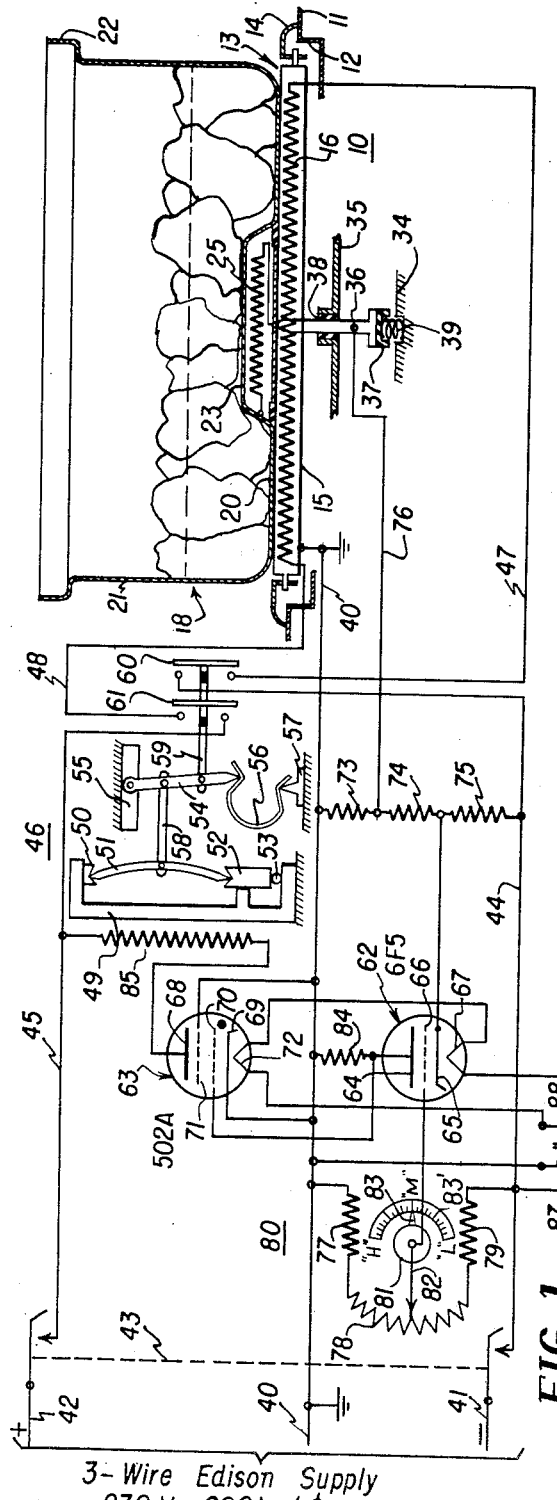
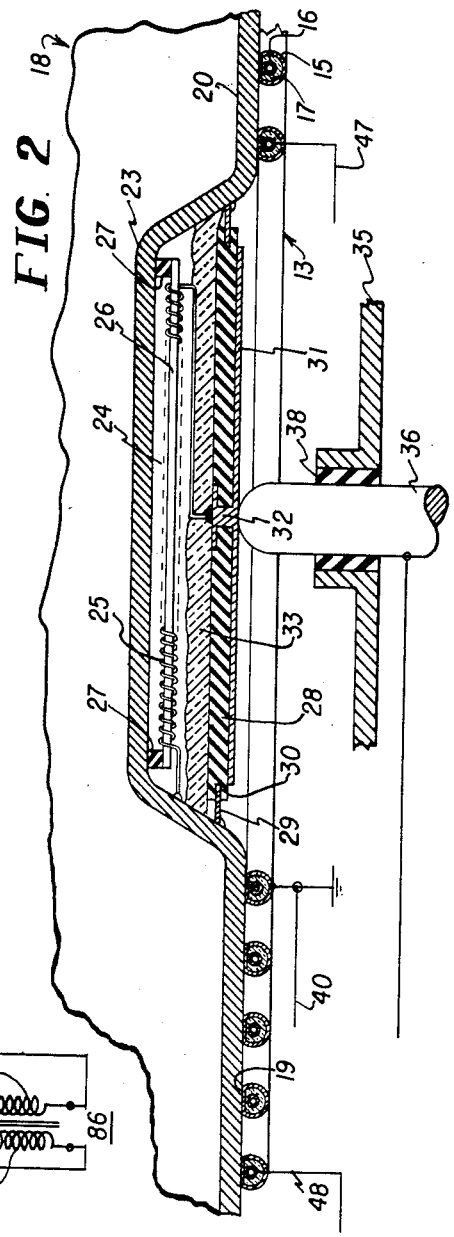
INVENTOR.
George W. Schroeder
BY Smith, Olsen + Baird
Attys.

Patented Aug. 10, 1954

2,686,250

UNITED STATES PATENT OFFICE 2,686,250

ELECTRIC HEATING APPARATUS

George W. Schroeder, Louisville, Ky., assignor to General Electric Company, a corporation of New York Application November 2, 1951, Serial No. 254,559

13 Claims. (Cl. 219—43)

The present invention relates to electric heating apparatus and more particularly to temperature responsive electric control systems therefor.

It has been proposed to provide in electric heating apparatus a cooking vessel that is removably supported upon an associated heating unit and that incorporates a thermostat which cooperates with a control switch supported adjacent to the heating unit and arranged between the source of electric power and the heating unit, whereby the control switch is governed jointly by placement and removal of the cooking vessel with respect to the heating unit and by the temperature of the contents of the cooking vessel. More particularly placement of the cooking vessel, when the contents thereof are at a relatively low temperature, upon the heating unit operatively associates the thermostat with the control switch so that the control switch is operated into its closed position effecting connection of the heating unit to the source of electric power, whereby the cooking vessel and its contents are heated. Subsequently when the cooking vessel and its contents are sufficiently heated to elevate the temperature thereof to a relatively high temperature, the thermostat operates the control switch into its open position to effect disconnection of the heating unit from the source of electric power, whereby the cooking vessel and its contents are cooled as time proceeds. This cycle of operation of the thermostat is repeated in order to hold the relatively high temperature of the contents of the cooking vessel during the cooking time interval. Finally removal of the cooking vessel at any time from the heating unit effects operations of the control switch into its open position independently of the thermostat.

While the arrangement described is reasonably satisfactory in operation, it does not lend itself well to the control of heating units that require heavy electric currents in operation since space considerations restrict the size and the capacity of the control switch that may be operatively associated with the heating unit. Moreover the arrangement does not accommodate ready adjustment of the thermostat over a suitable temperature range; and finally the thermostat is influenced in its operation primarily by the temperature of the heating unit and not primarily by the temperature of the contents of the cooking vessel as desired.

Accordingly it is the general object of the present invention to provide in an electric heating apparatus of the character noted, an improved and simplified temperature responsive electric control system that avoids the defects mentioned.

Another object of the invention is to provide in such electric heating apparatus, an improved control circuit arrangement wherein the control switch that governs the supply of electric power to the electric heating unit is disposed remote therefrom so that no artificial design characteristics based upon space limitations are imposed upon the construction of the control switch.

Another object of the invention is to provide in such electric heating apparatus, an improved control arrangement that includes an electronic circuit disposed between a temperature sensing resistor carried by the cooking vessel and a control switch that is selectively operative to govern the supply of electric power to the electric heating unit.

A further object of the invention is to provide in an electric heating system including a heating unit, an article to be heated operatively associated with the heating unit, a power source and a switch arranged between the power source and the heating unit, an improved circuit network comprising a temperature sensing resistor arranged in good heat exchange relation with the object and an electronic relay arrangement governed by the temperature sensing resistor for selectively controlling the switch in order selectively to control the temperature of the object, whereby the desired temperature of the object may be readily and accurately set within a relatively wide temperature range merely by correspondingly setting the characteristic of the electronic relay arrangement.

A still further object of the invention is to provide in an electric heating system of the character described, a control circuit arrangement that employs a thermal relay which introduces a desired time lag between the temperature of the object and the operation of the switch that controls the supply of electric power to the heating unit.

Further features of the invention pertain to the particular arrangement of the elements of the electric heating apparatus and of the temperature responsive control circuit network therefor, whereby the above-outlined and additional operating features thereof are attained.

The invention, both as to its organization and method of operation, together with further objects and advantages thereof, will best be understood by reference to the following specification taken in connection with the accompanying drawing, in which Figure 1 is a combination vertical sectional view of electric heating apparatus and a diagram of the temperature responsive circuit control network therefor embodying the present invention; and Fig. 2 is an enlarged fragmentary vertical sectional view of the lower portion of the heating apparatus, illustrating the cooperation between the cooking vessel and the supporting heating unit therefor.

Referring now to the drawing, the electric heating apparatus 10 there illustrated and embodying the features of the present invention comprises an external support 11 having an annular opening 12 formed therein in which a heating unit 13 is removably mounted in place by an arrangement including an annular ring 14 cooperating between the external support 11 and the heating unit 13. Preferably the heating unit 13 is of the sheathed resistance conductor type including an external tubular metal sheath 15 and an internal helical resistance conductor or heating element 16, the heating element 16 being positioned within the sheath 15 by an interposed mass of highly compacted electrically insulating and heat conducting material 17, such as magnesium oxide, or the like. The heating unit 13 is arranged in a substantially flat spiral form providing a central opening therethrough and a substantially horizontal supporting surface adapted removably to support an associated cooking vessel 18. More particularly the upper surfaces of the adjacent convolutions of the sheath 15 of the heating unit 13 are flattened as indicated at 19 in order to provide the substantially horizontal support for the bottom wall of the cooking vessel 18.

Preferably the cooking vessel 18 is formed of metal, such as aluminum, or the like, and comprises a substantially flat bottom wall 20 terminating in an upstanding side wall 21 provided with a marginal flange 22 adjacent to the top thereof that is adapted to receive a removable cover, not shown. The bottom wall 20 of the cooking vessel 18 is provided with a centrally disposed upwardly directed substantially annular boss 23 providing a cavity 24 therein in which there is arranged a temperature sensing resistor 25. The temperature sensing resistor 25 comprises a suitable length of resistance wire having a substantial positive temperature coefficient of resistance and wound upon a supporting element 26 formed of lava, or other insulating material, and positioned in the cavity 24 by an arrangement including suitable insulators 27 and disposed adjacent to and in good heat exchange relation with the adjacent wall of the boss 23. The opening into the cavity 24 is closed and hermetically sealed by an arrangement including a substantially annular plate 28 formed of lava, or other insulating material, and a cooperating metal ring 29, the outer edge of the ring 29 being suitably soldered to the adjacent wall of the boss 23 and the inner edge of the ring 29 being suitably anchored in place in an annular groove 30 formed about the edge of the plate 28. The lower surface of the plate 28 carries a substantially annular contact button 31 that is arranged in spaced relation with respect to the ring 29 and the adjacent wall of the boss 23 and insulated therefrom. One terminal of the temperature sensing resistor 25 is soldered or otherwise electrically connected to the adjacent wall of the boss 23 and the other terminal thereof is soldered or otherwise electrically connected to a centrally positioned stem 32 provided on the contact button 31 and projecting into the cavity 24. Finally a blanket or layer of asbestos, or other thermal insulating material, 33 is arranged over the upper surface of the insulating plate 28 and below the temperature sensing resistor 25. In view of the foregoing, it will be understood that the temperature sensing resistor 25 is electrically connected between the bottom wall 20 of the cooking vessel 18 and the contact button 31 carried thereby and is arranged in good heat exchange relation with the adjacent wall of the boss 23 provided in the bottom wall 20 so that the temperature sensing resistor 25 is readily responsive to the temperature of the contents of the cooking vessel 18. Moreover the arrangement of the blanket of thermal insulating material 33 between the temperature sensing resistor 25 and the insulating plate 28 shields the temperature sensing resistor 25 from direct heating effects produced by the heating unit 13. In other words, when the bottom wall 20 of the cooking vessel 18 is supported upon the surface of the heating unit 13, the contents of the cooking vessel 18 are heated directly through the bottom wall 20 from the heating unit 13 and the temperature sensing resistor 25 is heated primarily from the adjacent wall of the boss 23 and is consequently responsive to the temperature of the contents of the cooking vessel 18.

Also the heating apparatus 10 comprises external structures 34 and 35 that movably mount a metal plunger or contact 36 in position in cooperating relation with the centrally disposed opening formed in the heating unit 13 and consequently in cooperating relation with respect to the contact button 31 carried by the bottom of the cooking vessel 18. More specifically the contact plunger 36 is suitably insulated from the supporting structures 34 and 35 by interposed insulators 37 and 38, and is biased upwardly into the centrally disposed opening provided in the heating unit 13 by a cooperating coil spring 39.

In view of the foregoing description of the construction and arrangement of the heating apparatus 10, it will be understood that the cooking vessel 18 may be readily placed and removed with respect to the cooperating heating element 13, whereby the cooking vessel 18 may be washed or otherwise cleaned in a ready and convenient manner. However when the cooking vessel 18 is supported upon the heating unit 13 not only is the bottom wall 20 thereof arranged in good heat exchange relation with respect to the sheath 15 but good electrical contact is established therebetween and good electrical contact is also established between the contact button 31 carried by the bottom of the cooking vessel 18 and the contact plunger 36 slidably carried by the structures 34 and 35, whereby the temperature sensing resistor is electrically connected between the sheath 15 and the contact plunger 36 for a purpose more fully explained hereinafter. Of course when the cooking vessel 18 is removed from the heating unit 13, the temperature sensing resistor 25 is disconnected from across the sheath 15 and the contact plunger 36 in an obvious manner. In the arrangement the resistance of the temperature sensing resistor 25 is high with respect to the contact resistance between the bottom wall 20 of the cooking vessel 18 and the sheath 15 of the heating unit 13 and with respect to the contact resistance between the contact button 31 and the contact plunger 36 so that the resistance of an electric circuit between the sheath 15 of the heating unit 13 and the contact plunger 36 consists primarily and essentially of the resistance of the temperature sensing resistor 25. Also since the temperature sensing resistor 25 has a substantial positive temperature coefficient of resistance, it will be appreciated that the external resistance of the electric circuit mentioned will be relatively low when the temperature of the temperature sensing resistor 25 is relatively low corresponding to a relatively low temperature thereof, whereas the external resistance of the electric circuit mentioned will be relatively high when the temperature of the temperature sensing resistor 25 is relatively high corresponding to a relatively high temperature thereof. Since the temperature of the temperature sensing resistor 25 follows the temperature of the contents of the cooking vessel 18, it will be appreciated that the external resistance of the electric circuit mentioned is appropriately controlled by the temperature sensing resistor 25 in accordance with the temperature of the contents of the cooking vessel 18 when the cooking vessel 18 occupies its supported position upon the cooperating heating unit 13.

The electric heating system that is incorporated in the heating apparatus 10 further comprises a three-wire Edison source of alternating current supply of 230 volts, 60 cycles, single phase, and provided with the usual grounded neutral conductor 40 and the two ungrounded outside conductors 41 and 42. Also the circuit network includes a master switch 43 that is operative selectively to connect and to disconnect the outside conductors 41 and 42 with respect to two distribution conductors 44 and 45, as well as a thermal relay 46 that is operative selectively to connect and to disconnect the distribution conductors 44 and 45 with respect to two other distribution conductors 47 and 48 that are respectively connected to the outside terminals of the heating element 16 incorporated in the heating unit 13. The master switch 43 is of any suitable manually operable type; and preferably the thermal relay 46 is of the general construction and arrangement of that disclosed in the copending application of Nicholas Miller, Serial No. 85,890, filed April 6, 1949, now Patent No. 2,585,340, granted February 12, 1952. More specifically the thermal relay 46 comprises an externally supported substantially E-shaped base 49 formed of material having a high thermal coefficient of expansion, such as aluminum, and a series of elements 50, 51, 52 and 53 formed of a material having a substantially zero thermal coefficient of expansion, such as "Invar," a nickel-steel alloy consisting essentially of approximately 36-40% nickel and 60-64% iron. The elements 50, 51, 52 and 53 are retained in series relation between the ends of the outside legs of the substantially E-shaped base 49, the middle leg of the substantially E-shaped base 49 cooperating with the element 52 to retain the assembly in place. The element 50 is in the form of a block; the element 53 is in the form of a rod; the element 52 is in the form of a bar; and the element 51 is in the form of a bow spring retained under compression between the adjacent ends of the block 50 and the bar 52, the opposite ends of the bow spring 51 terminating in knife edges that are respectively received in knife rests respectively formed in the block 50 and in the bar 52. Also the thermal relay 46 comprises a lever 54 pivotally mounted at one end in an externally supported block 55 and provided with a knife edge at the other end thereof that engages one end of a substantially U-shaped spring 56, the other end of the U-shaped spring 56 engaging a knife edge carried by an externally supported block 57. The substantially U-shaped spring 56 cooperating with the lever 54 and the two blocks 55 and 57 comprises an overcenter mechanism, whereby the lever 54 is moved with a snap action overcenter with respect to a line drawn between the pivot carried by the block 55 and the knife edge carried by the block 57. The lever 54 is operatively connected by an element 58 to the bow spring 51 and to a contact actuating rod 59 that carries two contact bridging members 60 and 61. The bridging member 60 selectively controls a pair of contacts respectively terminating the conductors 44 and 47; and the bridging member 61 selectively controls a pair of contacts respectively terminating the conductors 45 and 48.

The thermal relay 46 normally occupies its open circuit position illustrated in Fig. 1, when the base 49 is cool and occupies its contracted position retaining the bow spring 51 under considerable compression so as to retain the lever 54 in its overcenter position away from the bow spring 51, whereby the bridging members 60 and 61 respectively disengage the associated pairs of contacts. In order to operate the thermal relay 46 into its closed circuit position, it is only necessary to heat the base 49, whereby the expansion thereof reduces the compression in the bow spring 51 so that the lever 54 is moved into its overcenter position toward the bow spring 51, whereby the bridging members 60 and 61 respectively engage the associated pairs of contacts. Subsequently, the thermal relay 46 may be operated back into its open circuit position merely by allowing the base 49 to cool so that the lever 54 is again returned away from the bow spring 51 moving the bridging members 60 and 61 back into disengagement with respect to the associated pairs of contacts.

Further the circuit network comprises a vacuum tube 62 that is preferably of the 6F5 type, and a gaseous discharge or thyratron tube 63 that is preferably of the 502A type. The vacuum tube 62 is provided with an anode or plate 64, a cathode 65 of the thorium, etc., oxide-coated type, a control grid 66, and a cathode heater 67; and the gaseous discharge tube 63 is provided with a plate or anode 68, a cathode 69 of the thorium, etc., oxide-coated type, a control grid 70, a suppressor grid 71 and a cathode heater 72. The conductor 40 is connected to the sheath 15 of the heating unit 13 that is, in turn, grounded within the heating apparatus 10, and a first resistance bridge is connected between the conductors 40 and 44, and consisting of three series related resistors 73, 74 and 75. The junction between the resistors 73 and 74 is connected by a conductor 76 to the contact plunger 36; while the junction between the resistors 74 and 75 is connected to the cathode 65 of the vacuum tube 62. Also a second resistance bridge is connected between the conductors 40 and 44, and consisting of three series related resistors 77, 78 and 79. The resistor 78 comprises the resistance element of an adjustable potentiometer or temperature setting device 80 that also includes a manually rotatable knob 81 provided with a wiper 82 that slidably engages the resistor 78, the wiper 82 being connected to the control grid 66 of the vacuum tube 62. Also the knob 81 is provided with an index pointer 83 that cooperates with an associated index scale 83' that may be calibrated in terms of degrees F., the indices "H," "M" and "L" indicated on the scale 83' corresponding to high, medium and low temperature settings of the temperature setting device 80. The anode 64 of the vacuum tube 62 is connected via a first load resistor 84 to the conductor 40; and the cathode 69, as well as the suppressor grid 71 of the gaseous discharge tube 63, are directly connected to the conductor 40. The anode of the gaseous discharge tube 63 is connected via a second load resistor 85 to the conductor 45; and the second load resistor 85 is arranged in good heat exchange relation with the base 49 of the thermal relay 46 for a purpose more fully explained hereinafter. Further the control grid 70 of the gaseous discharge tube 63 is connected to the junction between the anode 64 of the vacuum tube 62 and the adjacent terminal of the first load resistor 84.

Finally, the circuit network comprises a cathode heater transformer 86 provided with a primary winding 87 bridged between the conductors 40 and 44 and a secondary winding 88 connected to the cathode heaters 67 and 72 arranged in series circuit relation. Thus it will be understood that when the master switch 43 occupies its closed position, the primary winding 87 of the cathode heater transformer 86 is energized effecting heating of the cathode heaters 67 and 72 and the consequent heating of the cathodes 65 and 69 of the respective tubes 62 and 63 rendering the cathodes mentioned electron-emissive.

Considering now the operation of the electric heating system in conjunction with the apparatus 10, it is noted that the master switch 43 normally occupies its open position and the thermal relay 46 normally occupies its open circuit position, whereby the outside conductors 41 and 42 are disconnected from the conductors 44 and 45, and the conductors 44 and 45 are disconnected from the conductors 47 and 48. Now when the cook wishes to carry out a cooking operation in the cooking vessel 18, she may first operate the master switch 43 into its closed position, it being assumed that the cooking vessel 18 is removed from the heating unit 13 at this time. When the master switch 43 is operated into its closed position, the outside conductors 41 and 42 are connected to the conductors 44 and 45, whereby current flows through the first resistance bridge including the series related resistors 73, 74 and 75 and current flows through the second resistance bridge including the series related resistors 77, 78 and 79. When the voltage on the outside conductor 42 is positive with respect to the neutral conductor 40, the voltage on the outside conductor 41 is negative with respect to the neutral conductor 40, whereby the voltage drop across the resistors 73 and 74 is applied as a negative voltage to the cathode 65 of the vacuum tube 62, and the voltage drop across the resistor 77 and the upper portion of the resistor 78 is applied via the wiper 82 as a negative voltage to the control grid 66 of the vacuum tube 62. In the arrangement, the negative voltage that is applied to the control grid 66 is only somewhat greater than the negative voltage that is applied to the cathode 65, whereby there is only a small negative bias applied between the control grid 66 and the cathode 65, rendering the vacuum tube 62 conductive. Of course it will be understood that the value of the negative bias applied between the control grid 66 and the cathode 65 of the vacuum tube 62 is dependent upon the adjusted position of the temperature setting device 80, the negative bias mentioned being respectively relatively high, medium and low when the knob 81 occupies its respective high, medium and low positions, as indicated by the cooperation between the pointer 83 and the scale 83'.

In any case, and regardless of the position of the temperature setting device 80, at this time, the negative bias between the control grid 66 and the cathode 65 renders the vacuum tube 62 conductive; whereby the current traversing the vacuum tube 62 produces a voltage drop across the first load resistor 84 that is applied as a negative bias between the control grid 70 and the cathode 69, driving the gaseous discharge tube 63 to cut-off; whereby no current traverses the second load resistor 85 so that the thermal relay 46 is retained in its open circuit position.

The cook now proceeds to prepare the food and places it in the cooking vessel 18, whereupon the cooking vessel 18 is placed in a supported position upon the heating unit 13, effecting bridging of the temperature sensing resistor 25 across the sheath 15 and the contact plunger 36 and consequently across the pair of conductors 49 and 76 so that the temperature sensing resistor 25 is connected in multiple with the resistor 73. At this time, it is assumed that the temperature of the cooking vessel 18 and its contents is relatively low, whereby the temperature of the temperature sensing resistor 25 is relatively low producing a low composite resistance of the temperature sensing resistor 25 and the resistor 73 connected in parallel relation. When the effective resistance of the resistor 73 is thus reduced, an increased current flows in the first resistance bridge through the resistors 74 and 75 producing an increased voltage drop across the resistor 75 so that the negative voltage applied to the cathode 65 is reduced, whereby the negative bias applied between the control grid 66 and the cathode 65 is effectively increased driving the vacuum tube 62 to cut-off. The interruption of current in the first load resistor 84 removes the bias between the control grid 70 and the cathode 69 rendering the gaseous discharge tube 63 conductive. The current traversing the second load resistor 85 effects heating of the base 49 of the thermal relay 46; whereby after a short time interval, the thermal relay 46 is operated into its closed circuit position in the manner previously explained, in order to connect the conductors 44 and 45 to the conductors 47 and 48 so as to effect heating of the heating element 16 in the heating unit 13.

The heating element 16 effects heating of the sheath 15 and the consequent heating of the bottom wall 20 of the cooking vessel 18 and its contents whereby the contents of the cooking vessel 18 effects heating of the temperature sensing resistor 25 in the manner previously explained. As the temperature of the contents of the cooking vessel 18 increases, the temperature of the temperature sensing resistor 25 increases effecting a corresponding increase in the resistance thereof, whereby the composite resistance of the resistor 73 and the temperature sensing resistor 25 is effectively increased. As the effective resistance of the resistor 73 is thus increased, the current traversing the first resistance bridge is correspondingly reduced, whereby the negative voltage applied to the cathode 65 is reduced in order correspondingly to reduce the bias applied between the control grid 66 and the cathode 65 of the vacuum tube 62. Ultimately when the temperature of the contents of the cooking vessel 18 reach the desired temperature, the resistance of the temperature sensing resistor 25 brings about an increase in the effective resistance of the resistor 73 so that the bias applied between the control grid 66 and the cathode 65 is reduced so as to render the vacuum tube 62 again conductive. At this time the current traversing the first load resistor 84 produces a negative bias that is applied between the control grid 70 and the cathode 69 driving the gaseous discharge tube 63 to cutoff so that the current traversing the second load resistor 85 is interrupted.

The base 49 of the thermal relay 46 begins to cool and after a short time interval the thermal relay 46 is operated back into its open circuit position interrupting at the bridging members 60 and 61, the supply of current from the outside conductors 41 and 42 to the heating element 16 of the heating unit 13, whereby the cooking vessel 18 and its contents begin to cool. As the cooking vessel 18 and its contents cool, the temperature of the temperature sensing resistor 25 is reduced effecting a reduction in the resistance thereof and consequently in the effective resistance of the resistor 73, whereby ultimately the vacuum tube 62 is again driven to cutoff again rendering the gaseous discharge 63 conductive so that the thermal relay 46 is again operated into its closed circuit position. The above cycle is repeated so that electric energy is supplied intermittently to the heating unit 13 in order to hold the temperature of the cooking vessel 18 and its contents substantially at the desired relatively high cooking temperature during the cooking time interval.

In view of the foregoing, it will be understood that at any time should the cooking vessel 18 be removed from its supported position upon the heating unit 13 the temperature sensing resistor 25 would be disconnected from across the resistor 73 so that the vacuum tube 62 is rendered conductive in order to drive the gaseous discharge tube 63 to cutoff, whereby the thermal relay 46 is returned into its open circuit position interrupting the supply of electric energy to the heating unit 13 even though the master switch 43 occupies its closed position.

At the conclusion of the cooking operation, the cook removes the cooking vessel 18 and its contents from its supported position upon the heating unit 13 and returns the master switch 43 into its open position. When the master switch 43 is thus returned into its open position, the circuit for the vacuum tube 62 is opened and a further point in the circuit for supplying electric energy to the heating unit 13 is opened, whereby the heating system occupies its normal deenergized condition.

It is noted that the resistance of the resistor 73 is relatively high with respect to that of the temperature sensing resistor 25; that the resistance of the resistor 74 is relatively high with respect to that of the resistor 73; and the resistance of the resistor 75 is relatively high with respect to that of the resistor 74. This arrangement insures that the voltage drop across the resistor 73 never exceeds 12 volts which is below the threshold of feeling. Since the last-mentioned voltage is employed between the sheath 15 and the contact plunger 36, the arrangement positively avoids shock hazard, as there is always the possibility that the cook may touch simultaneously the contact plunger 36 and the sheath 15 when the master switch 43 is closed and when the cooking vessel 18 is removed from its supported position upon the heating unit 13 and when the heating unit 13 is cool. Also the relationship between the resistances of the resistors noted insures proper bias between the control grid 66 and the cathode 65 of the vacuum tube 62.

As previously noted, the temperature setting device 80 is selectively operative to set the temperature at which it is desired to hold the contents of the cooking vessel 18; and this result proceeds from the potentiometer connection between the wiper 82 and the associated resistor 78. For example, in the event the knob 81 is rotated from its medium position toward its high position, the wiper 82 is moved along the resistor 78 toward the resistor 79, thereby applying an increased negative voltage to the control grid 66 so as to establish a corresponding increased initial negative bias between the control grid 66 and the cathode 65 of the vacuum tube 62; which initial bias must be overcome by a corresponding increase in the resistance of the temperature sensing resistor 25 when the cooking vessel 18 occupies its supported position upon the heating unit 13; which result will be effected at a corresponding higher temperature of the contents of the cooking vessel 18. On the other hand in the event the knob 81 is rotated from its medium position toward its low position, the wiper 82 is moved along the resistor 78 toward the resistor 77, thereby applying a reduced negative voltage to the control grid 66 so as to establish a corresponding reduced initial negative bias between the control grid 66 and the cathode 65 of the vacuum tube 62; which initial bias must be overcome by a corresponding increase in the resistance of the temperature sensing resistor 25 when the cooking vessel 18 occupies its supported position upon the heating unit 13; which result will be effected at a corresponding lower temperature of the contents of the cooking vessel 18.

By way of illustration, the heating apparatus 10 may be employed in carrying out various cooking operations in the cooking vessel 18, such, for example, as warming at a temperature of approximately 150° F., steaming at a temperature of approximately 212° F., pan frying at a temperature within the approximate range of 300° to 450° F., and deep fat frying at a temperature within the approximate range of 350° to 400° F.; whereby the resistors 77, 78 and 79 are appropriately selected so that the medium point upon the scale 83' corresponds to a temperature of approximately 300° F., and the low and high points on the scale 83' respectively correspond to temperatures of approximately 150° F. and 450° F. Moreover the scale 83' may be appropriately marked with the temperature indicia mentioned.

From the foregoing description of the electric heating system, it will be understood that the temperature of the temperature sensing resistor 25 is highly sensitive to the temperature of the contents of the cooking vessel 18 and is influenced only to a limited extent by the temperature of the heating unit 13. Moreover since the temperature setting device 80 is arranged entirely remote from the vicinity of the heating unit 13 and the cooking vessel 18, the temperature at which it is desired to hold the contents of the cooking vessel 18 may be readily adjusted at any time and even after the cooking operation has been initiated. Further since the thermal relay 46 is disposed remote from the vicinity of the heating unit 13, the design thereof may be appropriately selected in order safely to control the current that is supplied to the heating unit 13 even though the normal current mentioned may be considerably large. Finally, the arrangement of the thermal relay 46 introduces a desirable time lag between a heating demand condition of the temperature sensing resistor 25 and the actual closing of the bridging members 60 and 61 by the thermal relay 46, as well as a desirable time lag between a heating satisfied condition of the temperature sensing resistor 25 and the actual opening of the bridging members 60 and 61 by the thermal relay 46. These time lags are dependent upon the operating characteristics of the thermal relay 46 and may be normally set incident to the manufacture thereof.

In view of the foregoing, it is apparent that there has been provided in electric heating apparatus an improved and simplified electric control system that is selectively governed jointly in response to placement and removal of the cooking vessel with respect to the associated supporting heating unit and in response to the temperature of the contents of the supported cooking vessel.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including a heating unit provided with a metal sheath enclosing a heating element electrically insulated therefrom and arranged in good heat conducting relation therewith, a vessel removably carried by said sheath, a power source, and a switch arranged between said power source and said heating element; the combination comprising a temperature sensing resistor having a substantial positive temperature coefficient of resistance and arranged in a wall of said vessel in good heat exchange relation therewith, one terminal of said temperature sensing resistor being electrically connected to the wall of said vessel and the other terminal of said temperature sensing resistor being electrically insulated from the wall of said vessel, a contact supported adjacent to said sheath and electrically insulated therefrom, a pair of conductors, one of said conductors being connected to said sheath and the other of said conductors being connected to said contact, the wall of said vessel and the other terminal of said temperature sensing resistor respectively engaging and disengaging said sheath and said contact respectively in response to placement and removal of said vessel with respect to said sheath so that said temperature sensing resistor is connected across said pair of conductors in response to placement of said vessel upon said sheath and said temperature sensing resistor is disconnected from across said pair of conductors in response to removal of said vessel from said sheath, an electron discharge tube provided with an input circuit including said pair of conductors and an output circuit, said tube being responsive to disconnection of said temperature sensing resistor from across said pair of conductors or to connection of said temperature sensing resistor across said pair of conductors when it has a relatively high resistance corresponding to a relatively high temperature thereof for establishing a first predetermined current condition in said output circuit and responsive to connection of said temperature sensing resistor across said pair of conductors when it has a relatively low resistance corresponding to a relatively low temperature thereof for establishing a second predetermined current condition in said output circuit, and means controlled by said first predetermined current condition in said output circuit for operating said switch into its open position and controlled by said second predetermined current condition in said output circuit for operating said switch into its closed position.

2. The electric heating apparatus combination set forth in claim 1, and further comprising means for limiting the voltage impressed between said pair of conductors included in said input circuit to a value below the threshold of feeling so as to avoid shock hazard.

3. In electric heating apparatus including a support, a vessel removably carried by said support, a heating element operatively associated with said support and arranged to heat said vessel carried by said support, a power source, and a switch arranged between said power source and said heating element; the combination comprising a temperature sensing resistor having a substantial positive temperature coefficient of resistance and arranged in good heat exchange relation with said vessel and incorporated therein and movable therewith with respect to said support, a biasing resistor, means controlled by placement of said vessel upon said support for connecting said temperature sensing resistor across said biasing resistor and controlled by removal of said vessel from said support for disconnecting said temperature sensing resistor from across said biasing resistor, an electron discharge tube provided with an anode and a cathode and a control grid, an input circuit including said biasing resistor for establishing a bias between the control grid and the cathode of said tube, said input circuit being responsive to disconnection of said temperature sensing resistor from across said biasing resistor or to connection of said temperature sensing resistor across said biasing resistor when it has a relatively high resistance corresponding to a relatively high temperature thereof for establishing a first predetermined bias and responsive to connection of said temperature sensing resistor across said biasing resistor when it has a relatively low resistance corresponding to a relatively low temperature thereof for establishing a second predetermined bias, an output circuit including the anode and the cathode of said tube, first and second predetermined current conditions prevailing in said output circuit in response to the respective establishment of said first and second predetermined bias, and means controlled by said first predetermined current condition in said output circuit for operating said switch into its open position and controlled by said second predetermined current condition in said output circuit for operating said switch into its closed position.

4. In an electric heating system including a support, a vessel removably carried by said support, a heating element operatively associated with said support and arranged to heat said vessel carried by said support, a power source, and a switch arranged between said power source and said heating element; the combination comprising a temperature sensing resistor having a substantial positive temperature coefficient of resistance and arranged in good heat exchange relation with said vessel and incorporated therein and movable therewith with respect to said support, a biasing resistor arranged remote from said vessel, a pair of conductors connecting said resistors in parallel relation, an electron discharge tube provided with an anode and a cathode and a control grid, an input circuit including said pair of conductors for establishing a bias between the control grid and the cathode of said tube, said input circuit establishing a first given bias in response to a relatively low composite resistance of said resistors corresponding to a relatively low temperature of said temperature sensing resistor and establishing a second given bias in response to a relatively high composite resistance of said resistors corresponding to a relatively high temperature of said temperature sensing resistor, an output circuit including the anode and the cathode of said tube, first and second given current conditions prevailing in said output circuit in response to the respective establishment of said first and second given bias, and means controlled by said first given current condition in said output circuit for operating said switch into its closed position and controlled by said second given current condition in said output circuit for operating said switch into its open position.

5. In an electric heating system including a support, a vessel removably carried by said support, a heating element operatively associated with said support and arranged to heat said vessel carried by said support, a power source, and a switch arranged between said power source and said heating element; the combination comprising a temperature sensing resistor having a substantial positive temperature coefficient of resistance and arranged in good heat exchange relation with said vessel and incorporated therein and movable therewith with respect to said support, a biasing resistor arranged remote from said vessel, a pair of conductors connecting said resistors in parallel relation, an electron discharge tube provided with an anode and a cathode and a control grid, an input circuit including said pair of conductors for establishing a bias between the control grid and the cathode of said tube, said input circuit establishing a first given bias in response to a relatively low composite resistance of said resistors corresponding to a relatively low temperature of said temperature sensing resistor and establishing a second given bias in response to a relatively high composite resistance of said resistors corresponding to a relatively high temperature of said temperature sensing resistor, an output circuit including the anode and the cathode of said tube, said first given bias driving said tube to cut-off and said second given bias rendering said tube conductive, and means controlled by the interruption of current in said output circuit for operating said switch into its closed position and controlled by the supply of current in said output circuit for operating said switch into its open position.

6. In an electric heating system including a support, a vessel removably carried by said support, a heating element operatively associated with said support and arranged to heat said vessel carried by said support, a power source, and a switch arranged between said power source and said heating element; the combination comprising a temperature sensing resistor having a substantial positive temperature coefficient of resistance and arranged in good heat exchange relation with said vessel and incorporated therein and movable therewith with respect to said support, a biasing resistor arranged remote from said vessel, a pair of conductors connecting said resistors in parallel relation, a vacuum tube provided with an anode and a cathode and a control grid, a first input circuit including said pair of conductors for establishing a bias between the control grid and the cathode of said vacuum tube, said first input circuit establishing a first given bias in response to a relatively low composite resistance of said resistors corresponding to a relatively low temperature of said temperature sensing resistor and establishing a second given bias in response to a relatively high composite resistance of said resistors corresponding to a relatively high temperature of said temperature sensing resistor, a first output circuit including the anode and the cathode of said vacuum tube, said first given bias driving said vacuum tube to cut-off and said second given bias rendering said vacuum tube conductive, a load element included in said first output circuit, a gaseous discharge tube provided with an anode and a cathode and a control grid, a second input circuit including said load element for establishing a bias between the control grid and the cathode of said gaseous discharge tube, said second input circuit establishing a predetermined bias in response to current in said load element, a second output circuit including the anode and the cathode of said gaseous discharge tube, said gaseous discharge tube being normally conductive and said predetermined bias driving said gaseous discharge tube to cut-off, and means included in said second output circuit and controlled by current therein for operating said switch into its closed position and controlled by the interruption of current therein for operating said switch into its open position.

7. In an electric heating system including a heating element, a power source provided with first and second supply conductors, a switch arranged between said power source and said heating element, and an object to be heated operatively associated with said heating element; the combination comprising a temperature sensing resistor having a substantial positive temperature coefficient of resistance and arranged in good heat exchange relation with said object, first and second and third resistors bridged in series relation in the order named between said first and second supply conductors, said temperature sensing resistor being connected across said first resistor, a fourth resistor connected between said first and second supply conductors, a load resistor, an electron discharge tube provided with an anode and a cathode and a control grid, a first connection via said load resistor between said first supply conductor and the anode of said tube, a second connection between the junction of said second and third resistors and the cathode of said tube, a third connection between an intermediate point on said fourth resistor and the control grid of said tube, said second and third connections establishing a negative bias between the control grid and the cathode of said tube, said third connection constituting a potentiometer connection accommodating adjustment of the initial value of said negative bias, said negative bias having a first given value when the resistance of said temperature sensing resistor is relatively low corresponding to a relatively low temperature thereof and having a second given value when the resistance of said temperature sensing resistor is relatively high corresponding to a relatively high temperature thereof, first and second given current conditions prevailing in said load resistor in response to said respective first and second given values of said negative bias, and means controlled by said first given current condition in said load resistor for operating said switch into its closed position and controlled by said second given current condition in said load resistor for operating said switch into its open position.

8. The electric heating system combination set forth in claim 7, wherein the resistance of said temperature sensing resistor is small compared to the resistance of said first resistor, and the resistance of said first resistor is small compared to the resistance of said second and third resistors in series relation.

9. In an electric heating system including a heating element, a single phase alternating current source of the three-wire Edison type provided with a grounded neutral conductor and two ungrounded outside conductors, a switch arranged between said Edison source and said heating element, and an object to be heated operatively associated with said heating element; the combination comprising a temperature sensing resistor having a substantial positive temperature coefficient of resistance and arranged in good heat exchange relation with said object, a first resistance bridge including said temperature sensing resistor connected between said neutral conductor and one of said outside conductors, a second resistance bridge connected between said neutral conductor and said one outside conductor, a first load resistor, a vacuum tube provided with an anode and a cathode and a control grid, a first connection via said first load resistor between said neutral conductor and the anode of said vacuum tube, a second connection between an intermediate point on said first resistance bridge and the cathode of said vacuum tube, a third connection between an intermediate point on said second resistance bridge and the control grid of said vacuum tube, said second and third connections establishing a first negative bias between the control grid and the cathode of said vacuum tube, said third connection constituting a potentiometer connection accommodating adjustment of the initial value of said first negative bias, said first negative bias having a first given value when the resistance of said temperature sensing resistor is relatively low corresponding to a relatively low temperature thereof and having a second given value when the resistance of said temperature sensing resistor is relatively high corresponding to a relatively high temperature thereof, first and second given current conditions prevailing in said first load resistor in response to said respective first and second given values of said first negative bias, a second load resistor, a gaseous discharge tube provided with an anode and a cathode and a control grid, a fourth connection via said second load resistor between said other outside conductor and the anode of said gaseous discharge tube, a fifth connection between said neutral conductor and the cathode of said gaseous discharge tube, a sixth connection between said first load resistor and the control grid of said gaseous discharge tube, said fifth and sixth connections establishing a second negative bias between the control grid and the cathode of said gaseous discharge tube, said second negative bias having a first predetermined value when said first current condition prevails in said first load resistor and having a second predetermined value when said second current condition prevails in said first load resistor, first and second predetermined current conditions prevailing in said second load resistor in response to said respective first and second predetermined values of said second negative bias, and means controlled by said first predetermined current condition in said second load resistor for operating said switch into its closed position and controlled by said second predetermined current condition in said second load resistor for operating said switch into its open position.

10. An electric control system comprising a source of current supply including first and second and third conductors, said first and third conductors being respectively negative and positive with respect to said second conductor, first and second impedance bridges connected across said first and second conductors in parallel relation, a first load impedance, a first electron discharge tube provided with an anode and a cathode and a control grid, a first connection via said first load impedance between said second conductor and the anode of said first tube, a second connection between an intermediate point on said first bridge and the cathode of said first tube, a third connection between an intermediate point on said second bridge and the control grid of said first tube, said second and third connections establishing a first given bias between the control grid and the cathode of said first tube, control means for varying the impedance of one of said bridges in order to establish a second given bias between the control grid and the cathode of said first tube, first and second current conditions prevailing in said first load impedance in response to the respective establishment of said first and second given bias, a second load impedance, a second electron discharge tube provided with an anode and a cathode and a control grid, a fourth connection via said second load impedance between said third conductor and the anode of said second tube, a fifth connection between said second conductor and the cathode of said second tube, a sixth connection between said first load impedance and the control grid of said second tube, said fifth and sixth connections respectively establishing first and second predetermined bias between the control grid and the cathode of said second tube in response to said first and second current conditions in said first load impedance, third and fourth current conditions prevailing in said second load impedance in response to the respective establishment of said first and second predetermined bias, and a device operated between first and second positions respectively in response to said third and fourth current conditions in said second load impedance.

11. An electric control system comprising a source of current supply including first and second and third conductors, said first and third conductors being respectively negative and positive with respect to said second conductor, first and second impedance bridges connected across said first and second conductors in parallel relation, a first load impedance, a first electron discharge tube provided with an anode and a cathode and a control grid, a first connection via said first load impedance between said second conductor and the anode of said first tube, a second connection between an intermediate point on said first bridge and the cathode of said first tube, a third connection between an intermediate point on said second bridge and the control grid of said first tube, said second and third connections establishing a first given bias between the control grid and the cathode of said first tube, one of said second or third connections constituting a potentiometer connection accommodating adjustment of the initial value of said first given bias, control means for varying the impedance of one of said bridges in order to establish a second given bias between the control grid and the cathode of said first tube, first and second current conditions prevailing in said first load impedance in response to the respective establishment of said first and second given bias, a second load impedance, a second electron discharge tube provided with an anode and a cathode and a control grid, a fourth connection via said second load impedance between said third conductor and the anode of said second tube, a fifth connection between said second conductor and the cathode of said second tube, a sixth connection between said first load impedance and the control grid of said second tube, said fifth and sixth connections respectively establishing first and second predetermined bias between the control grid and the cathode of said second tube in response to said first and second current conditions in said first load impedance, third and fourth current conditions prevailing in said second load impedance in response to the respective establishment of said first and second predetermined bias, and a device operated between first and second positions respectively in response to said third and fourth current conditions in said second load impedance.

12. An electric control system comprising a source of current supply including first and second and third conductors, said first and third conductors being respectively negative and positive with respect to said second conductor, first and second impedance bridges connected across said first and second conductors in parallel relation, a first load impedance, a first electron discharge tube provided with an anode and a cathode and a control grid, a first connection via said first load impedance between said second conductor and the anode of said first tube, a second connection between an intermediate point on said first bridge and the cathode of said first tube, a third connection between an intermediate point on said second bridge and the control grid of said first tube, said second and third connections establishing a first given bias between the control grid and the cathode of said first tube, said third connection constituting a potentiometer connection accommodating adjustment of the initial value of said first given bias, control means for varying the impedance of said first bridge in order to establish a second given bias between the control grid and the cathode of said first tube, first and second current conditions prevailing in said first load impedance in response to the respective establishment of said first and second given bias, a second load impedance, a second electron discharge tube provided with an anode and a cathode and a control grid, a fourth connection via said second load impedance between said third conductor and the anode of said second tube, a fifth connection between said second conductor and the cathode of said second tube, a sixth connection between said first load impedance and the control grid of said second tube, said fifth and sixth connections respectively establishing first and second predetermined bias between the control grid and the cathode of said second tube in response to said first and second current conditions in said first load impedance, third and fourth current conditions prevailing in said second load impedance in response to the respective establishment of said first and second predetermined bias, and a device operated between first and second positions respectively in response to said third and fourth current conditions in said second load impedance.

13. The electric heating apparatus combination set forth in claim 3 wherein said means for operating said switch includes a thermal relay having a time-lag in its operating characteristic so that said first predetermined current condition in said output circuit must prevail during a first given time interval before said switch is operated into its open position and so that said second predetermined current condition in said output circuit must prevail during a second given time interval before said switch is operated into its closed position.

References Cited in the file of this patent

UNITED STATES PATENTS

| Number | Name | Date |
| --- | --- | --- |
| 915,974 | Leonard | Mar. 23, 1909 |
| 1,542,850 | Curtis et al. | June 23, 1925 |
| 1,694,264 | Hull | Dec. 4, 1928 |
| 2,490,965 | Huck | Dec. 13, 1949 |
| 2,510,040 | Rudahl | May 30, 1950 |
| 2,552,480 | Dickey | May 8, 1951 |